United States Patent Office 2,812,315
Patented Nov. 5, 1957

2,812,315

COPOLYMERS OF HYDROXYNITRILES

John A. Price, Stamford, and Walter M. Thomas, Noroton Heights, Conn., assignors to American Cyanamid Company, New York, N. Y., a corporation of Maine No Drawing. Application August 19, 1954,
Serial No. 451,056

4 Claims. (Cl. 260—80.5)

This invention relates to the production of new materials having valuable and characteristic properties that make them especially suitable for use in industry, for example in the production of fibers, in adhesive compositions, as components of surface-coating and laminating compositions, and for various other purposes. More particularly the invention is concerned with products comprising a copolymer obtained by polymerization of a mixture of copolymerizable ingredients including (1) a hydroxynitrile represented by the general formula I
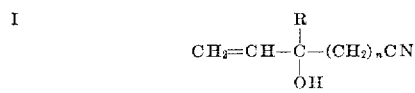

where R represents a member of the class consisting of hydrogen and the methyl radical, and $n$ represents a whole number from 0 to 1, inclusive, and (2) acrylonitrile, the hydroxynitrile of (1) constituting from about 5% to about 45% by weight of the total amount of (1) and (2). When $n$ in Formula I represents 0 the formula then becomes II
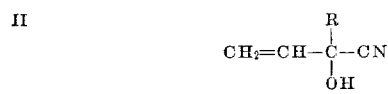

Illustrative examples of hydroxynitriles embraced by Formula I are 3-hydroxy-4-pentenenitrile (1-cyano-3-buten-2-ol), the formula for which is III
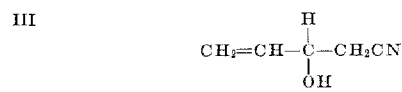

3 - hydroxy - 3 - methyl - 4 - pentenenitrile (1 - cyano - 2 - methyl - 3 - buten - 2 - ol), 2 - hydroxy - 3 - butenenitrile (1 - cyano - 2 - propen - 1 - ol) and 2 - hydroxy - 2 - methyl - 3 - butenenitrile (1 - cyano - 1 - methyl - 2 - propen-1-ol). The latter two compounds are embraced by Formula II.

The claims in the instant application are directed specifically to fiber-formable copolymers obtained by polymerization of a mixture of copolymerizable ingredients including, by weight, (1) from about 5.0% to about 8.9% of a hydroxynitrile of the kind embraced by Formula I, (2) from about 2.0% to about 5.0% of a monoethylenically unsaturated substance selected from the class consisting of (a) methyl acrylate, (b) vinyl acetate, (c) acrylamide, (d) methyl vinylpyridine consisting mainly of 2-methyl-5-vinylpyridine and (e) ethyl vinylpyridine consisting mainly of 2-vinyl-5-ethylpyridine, and (3) acrylonitrile constituting the remainder; and to products comprising an oriented fiber comprised of a fiber-formable copolymer, as defined above.

Hydroxynitriles of the kind embraced by Formula I are known compounds. For instance, Leupold et al. U. S. Patent No. 2,166,600 describes the preparation of 2-hydroxy-2-methyl-3-butenenitrile, which also may be named as the nitrile of α-vinyl lactic acid; de Bruyn, Rec. Trav. Chim., 4, 221–230 (1885), and van der Sleen, Rec. Trav. Chim., 21, 211–216 (1902), disclose 2-hydroxy-3-butenenitrile; and Bissinger et al., J. A. C. S., 69, 2955–2961 (1947), describe a method of preparing 3-hydroxy-4-pentenenitrile, which also may be named as butadiene cyanohydrin. However, to the best of our knowledge and belief, it was not known or suggested prior to our invention that new and valuable copolymer compositions could be produced by copolymerization of copolymerizable ingredients including a hydroxynitrile of the kind embraced by Formula I and a different ethylenically unsaturated compound, specifically acrylonitrile, and wherein the hydroxynitrile constitutes from about 5% to about 45%, more particularly from about 5 or 10% to about 20 or 30%, by weight of the total amount of hydroxynitrile and acrylonitrile. By using these particular comonomers in the particular range of proportions given hereinbefore, copolymers are produced that have characteristic and valuable properties. In general, the hydroxynitrile imparts hydrophilic characteristics to the copolymer. In addition, it provides reactive hydroxyl groups in the copolymer molecule, thereby rendering the copolymer more amenable to subsequent chemical treatments. When the copolymers are used as components of, for example, coating and laminating compositions, the hydroxyl groups present therein render them more compatible with other resinous or potentially resinous components commonly employed in such compositions. In the case of fiber-forming (fiber-formable) copolymers, specifically fiber-forming copolymers of ingredients comprising a major proportion by weight of acrylonitrile and a minor proportion by weight of other comonomers that are copolymerizable with acrylonitrile and which include a hydroxynitrile of the kind embraced by Formula I, the hydroxyl groups contained in the copolymer are instrumental in rendering the fiber more hydrophilic, more readily dyed and/or more receptive to various after-treatments as compared with a fiber formed from, for instance, a homopolymer of acrylonitrile.

It is a primary object of the present invention to prepare a new class of copolymers or interpolymers for use in industry.

Another object of the invention is to improve the usefulness of the hydroxynitriles embraced by Formula I.

Another object of the invention is the production of new acrylonitrile copolymer compositions which are more readily both fabricated (e. g., in fiber or other form) and dyed than homopolymeric acrylonitrile and copolymers of acrylonitrile such as those suggested in the prior art.

Other objects of the invention will be apparent to those skilled in the art from the description and examples which follow.

The foregoing objects are attained by copolymerization of a mixture of copolymerizable monomers including a hydroxynitrile of the kind embraced by Formula I and acrylonitrile in percentages thereof, by weight, ranging from about 5% to about 45% of the hydroxynitrile to from about 95% to about 55% of the acrylonitrile. Heat, light or heat and light can be used to effect or to accelerate polymerization of the mixture of comonomers, although under such conditions the rate of polymerization may be relatively slow. Hence, it is usually preferred to accelerate the polymerization by employing a polymerization catalyst accompanied by heat, light or heat and light. Ultraviolet light is more effective than ordinary light.

Any of the polymerization catalysts which are suitable for use in polymerizing compounds containing an ethylenically unsaturated grouping, specifically a vinyl grouping, can be employed. Among such catalysts are the various organic peroxy catalysts, illustrative examples of which latter are: the dialkyl peroxides, e. g., diethyl peroxide, dipropyl peroxide, dibutyl peroxide, dilauryl peroxide, dioleyl peroxide, distearyl peroxide, di-(tert.-butyl) peroxide and di-(tert.-amyl) peroxide; the alkyl hydrogen peroxides, e. g., tert.-butyl hydrogen peroxide (tert.-butyl hydroperoxide), tert.-amyl hydrogen peroxide (tert.-amyl hydroperoxide), etc.; symmetrical diacyl peroxides, for instance peroxides which commonly are known under such names as acetyl peroxide, propionyl peroxide, lauroyl peroxide, stearoyl peroxide, malonyl peroxide, succinyl peroxide, phthaloyl peroxide, benzoyl peroxide, etc.; fatty oil acid peroxides, e. g., coconut oil acid peroxides, etc.; unsymmetrical or mixed diacyl peroxides, e. g., acetyl benzoyl peroxide, propionyl benzoyl peroxide, etc.; terpene oxides, e. g., ascaridole, etc.; and salts of inorganic per-compounds, examples of which are given hereinafter. Other so-called "free radical" types of catalysts, e. g., α,α'-azodiisobutyronitrile, also can be used to accelerate polymerization. The various known "redox" (reduction-oxidation) catalyst systems also can be employed, and are especially adapted for use when the mixed monomers are copolymerized in an aqueous medium. Such water-soluble catalyst systems generally comprise a water-soluble catalyst or catalysts and a water-soluble activator. Illustrative examples of water-soluble catalysts are water-soluble, oxygen-yielding peroxy compounds, e. g., the water-soluble peroxides, peracids and persalts, including hydrogen peroxide, organic peroxides, e. g., diacetyl peroxide, urea peroxide, etc., peracetic acid, the various water-soluble perchlorates, persulfates, percarbonates, perborates, perphosphates, etc., e. g., the ammonium and alkali-metal (sodium, potassium, lithium, etc.) salts of percarbonic, peracetic, perboric, perphosphoric, persulfuric, perchloric, etc., acids; and water-soluble ferric salts capable of yielding ferric ions, including the various ferric alums, e. g., ferric ammonium sulfate (ferric ammonium alum), ferric sodium sulfate, ferric potassium sulfate, etc. Other examples of water-soluble additives comprising a water-soluble catalyst that may be used in producing the copolymers of the present invention are given in, for instance, U. S. Patents 2,289,540, 2,380,474-5-6-7, 2,380,617-8, 2,380,710, 2,383,425, 2,384,544, 2,384,571, 2,384,574, 2,388,373 and 2,395,017.

Illustrative examples of water-soluble activators (water-soluble polymerization adjuvants) of the catalyst are oxygen-containing sulfur compounds which are capable of undergoing oxidation, for instance sulfur dioxide, the alkali-metal (e. g., sodium, potassium, etc.) bisulfites, hydrosulfites, thiosulfates, sulfurous acid (or compounds which engender sulfurous acid, e. g., alkali-metal sulfites, ethyl and other alkyl sulfites, etc.), various organic sulfinic acids, e. g., p-toluene sulfinic acid, formamidine sulfinic acid, etc. If alkali-metal sulfites, e. g., sodium sulfite, or similar compounds which engender sulfurous acid are used, the aqueous solution also should contain a strong acid, e. g., sulfuric acid, etc., in an amount which is at least chemically equivalent to the amount of such a compound engendering sulfurous acid that is employed.

If desired, the mixture of monomers can be polymerized in emulsion or in solution state to yield a copolymer. Good results are obtained by effecting copolymerization while the monomers are dissolved in a suitable solvent, preferably water or a liquid solvent comprising mainly water. Suitable inert organic solvents also can be used if desired, e. g., benzene, toluene, xylene, etc. Preferably the copolymerization reaction is carried out in a liquid medium in which the monomeric mixture is soluble but the copolymer is insoluble, e. g., water.

The polymerization also can be effected by conventional bulk polymerization technique, in the presence or absence of a solvent capable of dissolving the monomeric mixture and in which the latter preferably is inert; or by conventional bead polymerization methods. The polymerization of the mixture of monomers can be effected by a continuous process as well as by a batch operation.

The concentration of the catalyst is relatively small, e. g., from, by weight, about 1 part of catalyst per 1,000 parts of the monomeric mixture to about 4 or 5 parts of catalyst per 100 parts of the mixture of monomers. The amount of polymerization adjuvant or activator used likewise may be varied considerably, but generally is within the range of from about 0.1 to 1 molar proportion based on the catalyst used or an amount which is chemically equivalent to the amount of catalyst employed. The use of higher ratios of activator with respect to the catalyst is not precluded, e. g., 2 or 3 or more moles of activator per mole of catalyst, or correspondingly larger proportions on a chemical equivalent basis, but no particular advantages ordinarily accrue therefrom.

Forms of radiation other than ultraviolet or visible light may also be used to initiate polymerization. Examples of such types of radiation are high-energy particles (e. g., high-energy electrons), X-rays and gamma radiation. Cobalt-60 is a convenient source of gamma radiation. In all of these cases polymerization may be initiated either by direct effect of radiation on the monomers or indirectly (if a solvent or other substance is present) by the action of radicals resulting from irradiation of these substances.

The polymerization (copolymerization) reaction may be effected, if desired, while the aqueous medium is maintained under an atmosphere of an inert gas, for example nitrogen, helium, carbon dioxide, etc.; or, it may be (but preferably is not) carried out under an atmosphere of air.

The temperature at which the monomers are copolymerized can be varied over a wide range, up to and including or slightly above the boiling point (at atmospheric pressure) of the monomeric mixture. In most cases, the polymerization temperature will be within the range of about 20° or 30° C., preferably at least 35° or 40° C., up to the boiling temperature of the mixture of monomers, depending, for example, upon the particular catalyst, if any, used, the rapidity of polymerization wanted and other influencing factors. The use of polymerization temperatures substantially above the boiling point of the mixture of monomers is not precluded, but generally is less desirable because the polymerization reaction then must either be carried out in a closed reaction vessel under pressure, or, for economical reasons, with a reflux condenser or other means provided for the recovery and re-use of the volatilized monomer or monomers if the reaction is carried out at the boiling temperature of the mass under atmospheric pressure.

The copolymers of this invention can be produced in various molecular weights as desired or as conditions may require. Thus, the fiber-forming copolymers, more particularly the fiber-forming acrylonitrile copolymers, ordinarily are within the range of about 15,000 to about 300,000 or higher as calculated from viscosity measurements using the Staudinger equation (reference: U. S. Patent No. 2,404,713). Homogeneous acrylonitrile copolymers having an average molecular weight of between about 60,000 and 90,000 and which contain at least 70%, advantageously from about 85% to about 95% of acrylonitrile (combined acrylonitrile) in the molecule, are especially suitable for use in making dyeable, oriented fibers by wet- or dry-spinning methods.

If the copolymerization reaction is carried out while the mixed monomers are dissolved or dispersed in a liquid medium, e. g., in solution in water, the resulting copolymer then is separated from the said medium by any suitable means, e. g., by filtration, centrifuging, solvent extraction, etc.

In order that those skilled in the art may better understand how the present invention can be carried into effect, the following examples are given by way of illustration and not by way of limitation. All parts and percentages are by weight.

EXAMPLE 1

A reaction vessel, equipped with a stirrer, reflux condenser, thermometer and gas-inlet tube, is placed in a constant-temperature water bath which is maintained at 35° C. To the vessel is added a solution of 47.7 parts of acrylonitrile, 5.3 parts of 3-hydroxy-4-pentenenitrile, 900 parts of demineralized water and 0.0196 part of sulfuric acid. A rapid stream of pre-purified nitrogen is passed over the surface of the solution for 30 minutes. The nitrogen flow is then reduced to about one bubble per second. A reduction-oxidation catalyst system ("redox" system) consisting of 1.71 parts of ammonium persulfate and 0.71 part of sodium metabisulfite, each dissolved in 50 parts of water, is then added. The solution first becomes cloudy at the end of one minute and the polymerization is fairly exothermic for the first half hour. The polymerization is continued for a total of 5 hours at 35° C. The polymer is collected on a Büchner funnel, washed with about 2,000 parts of demineralized water and dried in an oven at 70° C. to constant weight. The yield of dry, white copolymer of acrylonitrile and 3-hydroxy-4-pentenenitrile amounts to 38 parts. The percentage of 3-hydroxy-4-pentenenitrile which is combined in the copolymer molecule is about 8.6%, as calculated from the results of a nitrogen analysis. The specific viscosity of a 1% solution of the copolymer dissolved in dimethyl formamide is 2.1.

Instead of using 5.3 parts of 3-hydroxy-4-pentenenitrile in the above formulation, one can use 5.3 parts of 3-hydroxy-3-methyl-4-pentenenitrile thereby to obtain a copolymer of acrylonitrile and the said hydroxynitrile. [3-hydroxy-3-methyl-4-pentenenitrile can be prepared, for example, by reacting 2-methylbutadiene monoxide-1,2 (which also may be named 2-methyl-2-vinyloxirane) with HCN in essentially the same manner as 3-hydroxy-4-pentenenitrile is prepared by reacting butadiene monoxide with HCN.]

EXAMPLE 2

The same procedure and conditions are followed, in general, as in Example 1 with the exception that the 3-hydroxy-4-pentenenitrile is replaced with an equal weight of 2-hydroxy-2-methyl-3-butenenitrile, and the total period of reaction is 6 hours instead of 5 hours. The yield of dry, white copolymer of acrylonitrile and 2-hydroxy-2-methyl-3-butenenitrile amounts to 42 parts. The percentage of 2-hydroxy-2-methyl-3-butenenitrile which is combined in the copolymer molecule is about 9.2%, as calculated from the results of a nitrogen analysis. The specific viscosity of a 1% solution of the copolymer dissolved in dimethyl formamide is 1.6.

EXAMPLE 3

The same general procedure is followed as described under Example 1. In this case, however, 5.3 parts of 2-hydroxy-3-butenenitrile is used in place of 5.3 parts of 3-hydroxy-4-pentenenitrile, and 0.36 part of sodium metabisulfite is employed in place of 0.71 part. Also, the total period of reaction is 6 hours instead of 5 hours. The yield of dry, white copolymer of acrylonitrile and 2-hydroxy-3-butenenitrile amounts to 43 parts. The percentage of 2-hydroxy-3-butenenitrile which is combined in the copolymer molecule is about 6.5%, as calculated from the results of a nitrogen analysis. The specific viscosity of a 1% solution of the copolymer dissolved in dimethyl formamide is 1.7.

EXAMPLE 4

To a reaction vessel equipped as in Example 1 are added 84.8 parts of acrylonitrile, 21.2 parts of 2-hydroxy-3-butenenitrile, 800 parts of demineralized water and 0.06 part of sulfuric acid. The pH of this solution is 3.4. A rapid stream of pre-purified nitrogen is passed over the surface of the solution for 30 minutes. The nitrogen flow is then reduced to about one bubble per second. A redox catalyst system is prepared by dissolving 3.42 parts of ammonium persulfate and 0.71 part of sodium meta-bisulfite, each in 100 parts of demineralized water. The catalyst solutions are added portion-wise to the reaction vessel at 25-minute intervals over a period of 2½ hours. After a total period of 5 hours, the product is collected on a Büchner funnel, washed with 2,000 parts of demineralized water and dried in an oven at 70° C. for 16 hours. The yield of dry, white copolymer of acrylonitrile and 2-hydroxy-3-butenenitrile amounts to 78 parts. The specific viscosity of a 1% solution of the copolymer dissolved in dimethyl formamide is 1.4.

EXAMPLE 5

This example illustrates the preparation of a ternary polymer containing in the polymer molecule an average of, by weight, about 6.4% of 3-hydroxy-4-pentenenitrile units, about 2.4% of units of methyl vinylpyridine consisting mainly of 2-methyl-5-vinylpyridine units, and the remainder acrylonitrile units.

The copolymerization is effected continuously, using apparatus which includes a reaction vessel that is provided with an overflow tube located at the top of the reaction vessel. Agitation is effected primarily by circulating the contents of the reaction vessel continuously through a high-speed centrifugal pump. Additional agitation in the reaction vessel is effected by means of a motor-driven propeller. The temperature is regulated by means of a heat-exchanger located in the circulating system. The solutions of monomeric material and of catalyst, hereafter described, are fed into the reaction vessel using variable-speed pumps.

The reactor is charged with a previously prepared aqueous slurry (e. g., a 35% aqueous slurry) of an acrylonitrile polymerization product (polymer or copolymer), more particularly (and for purpose of illustration and not by way of limitation) a two-component copolymer of about 95% acrylonitrile and 5% methyl acrylate. The following solutions are then fed in at such a rate that the stated quantities are delivered each hour.

Feed 1

|   | Parts |
|---|---|
| Ammonium persulfate | 24.1 |
| Sulfuric acid | 8.3 |
| Demineralized water | 1230.0 |

Feed 2

|   | |
|---|---|
| Methyl vinylpyridine consisting mainly of 2-methyl-5-vinylpyridine | 19.5 |
| 3-hydroxy-4-pentenenitrile | 78.0 |
| Acrylonitrile | 875.0 |

The percentage proportions of the foregoing copolymerizable ingredients are as follows: Methyl vinylpyridine consisting mainly of 2-methyl-5-vinylpyridine, 2.23%; 3-hydroxy-4-pentenenitrile, 8.91%; and acrylonitrile, 88.86%.

Feed 3

|   | |
|---|---|
| Sodium meta-bisulfiate | 2.89 |
| Demineralized water | 1250.00 |

The temperature of the slurry is maintained at 40° C., and the copolymerization reaction is stopped at the end of 6½ hours. The slurry resulting from the last 1½ hours of operation is combined with the final slurry in the reaction vessel.

The ternary polymer is isolated from the slurry by centrifuging, washed in the centrifuge with 40,000 parts of demineralized water, and dried in an oven at 70° C. for about 16 hours. A dry, white, dimethylformamide-soluble ternary polymer is obtained. Its chemical constitution is given in the first paragraph of this example.

Instead of charging an aqueous slurry containing about 35% of a previously prepared copolymer of about 95% acrylonitrile and 5% methyl acrylate to the reactor, one can use a slurry containing any other suitable concentration of the previously prepared acrylonitrile polymerization product (e. g., from 5 or 10% to 35 or 40% by weight of the slurry). One can use an aqueous slurry containing, for example, a previously prepared homopolymer of acrylonitrile, or of a copolymer (dipolymer, tripolymer, tetrapolymer, etc.) different from the aforementioned acrylonitrile-methyl acrylate copolymer, thereby to obtain a blend of the acrylonitrile polymerization product contained in the previously prepared slurry and of the copolymer with which this invention is concerned. When this practice is followed, the concentration of the initially prepared acrylonitrile polymerization product in the slurry decreases as the continuous polymerization proceeds and will approach zero concentration eventually. When one desires the final product to be composed solely of the copolymer of this invention, then one charges to the reactor an aqueous slurry containing a suitable concentration of a previously prepared copolymer of the invention. The polymerization reaction advantageously is carried out at a pH not higher than 6, e. g., from 2.5 to 5.9, and preferably from 3.5 or 4 to 5.9.

The foregoing polymerization technique has numerous advantages over the prior-art practices, including the advantages of providing higher overall yields of the copolymer; better control of the reaction; the more ready production of acrylonitrile copolymers having a specific, predetermined average molecular weight (this latter being particularly important when the copolymers are to be formed or fabricated into fibers); the obtainment of a more homogeneous polymeric product (that is, one which contains minimum amounts of polymer having a molecular weight outside the lower and higher limits of molecular weight wanted in the product); as well as others. This polymerization method for producing the copolymers of this invention is, to the best of our knowledge and belief, new and novel.

EXAMPLE 6

Twenty (20) parts of the ternary polymer of Example 5 is slurried by rapid stirring at room temperature in 80 parts of dimethylformamide. While protected by a blanket of carbon dioxide the temperature of the mixture is raised to 80° C. with slow stirring until all of the copolymer has dissolved to form a clear, viscous solution.

After deaeration and filtration the warm solution is extruded downwardly through a spinneret having 40 holes, each 70 microns in diameter, into a spinning cell, the inner wall of which is maintained at a temperature of approximately 425° C. by means of a fluid heating medium which circulates around the outer wall of the cell. A current of preheated gas at 125° C. is introduced at the bottom of the cell and passes upwardly countercurrent to the filaments which pass downwardly from the spinneret. By this means the major proportion of the dimethylformamide is evaporated from the filaments by the time the filaments have reached the bottom of the cell.

From the bottom of the cell the group of filaments or thread is led through water to remove the last of the dimethylformamide solvent, after which it is continuously dried by passing it over a pair of heated drying rolls. The dry multifilament thread is then thermoplastically stretched by conducting it through a slot which is maintained at 400° C. and thence to stretch rolls. Stretch is applied to the thread by having the surface speed of the rolls on the delivery end of the heated slot about 8 times that of the surface speed of the rolls which feed the thread to the slot. The filaments are oriented along the fiber axis by this stretching operation.

The thermoplastically stretched thread is more lustrous than that of the unstretched thread. To remove residual strains or shrinkage, the thread is conducted through a second, heated slot at 400° C. and thence to a pair of rolls, the surface speed of which is adjusted to permit about 15% shrinkage of the thread in the slot. After this thermoplastic treatment the thread is collected on a ring-twister bobbin.

The finished thread is tested for its dyeability, in comparison with threads similarly prepared from homopolymeric acrylonitrile, as follows:

Swatches (10 parts) of each of the dry fibers are added to a dye bath consisting of 500 parts of an aqueous solution containing 0.2 part of concentrated sulfuric acid, 1 part of sodium sulfate and 0.2 part of Calcocid Alizarine Blue SAPG (Color Index No. 1054). The dye bath is boiled for 30 minutes, after which the swatches are removed, and washed with hot water until the water is free of dye. The swatch of homopolymeric acrylonitrile fibers fail to absorb any dye whereas the swatch of fibers of this example is dyed a deep blue.

EXAMPLE 7

This example illustrates the preparation of a ternary polymer containing in the polymer molecule an average of, by weight, about 4% of methyl acrylate units, about 5% of units of 2-hydroxy-2-methyl-3-butenenitrile, and the remainder acrylonitrile units.

The same apparatus and general procedure are employed as in Example 5. The reactor is charged with an aqueous slurry composed of 420 parts of homopolymeric acrylonitrile and 1,180 parts of demineralized water having dissolved therein 2.67 parts of sulfuric acid. The system is purged with nitrogen as in Example 5. The following solutions are then fed in at such a rate that the stated quantities are delivered each hour:

*Feed 1*

| | Parts |
|---|---|
| Acrylonitrile | 194.4 |
| Methyl acrylate | 10.8 |
| 2-hydroxy-2-methyl-3-butenenitrile | 10.8 |
| tert.-Dodecyl mercaptan | 0.3 |

The percentage proportions of the foregoing copolymerizable ingredients (first three in the list) are as follows: Acrylonitrile, 90.0%; methyl acrylate, 5.0%; and 2-hydroxy-2-methyl-3-butenenitrile, 5.0%.

*Feed 2*

| | |
|---|---|
| Sodium chlorate | 0.85 |
| Sodium sulfite | 2.98 |
| Demineralized water | 290.00 |

*Feed 3*

| | |
|---|---|
| Sulfuric acid | 1.4 |
| Demineralized water | 290.0 |

The temperature of the slurry is maintained at 45° C., and the copolymerization reaction is stopped at the end of 5 hours. The ternary polymer is isolated from the reactor slurry by collection on a Büchner funnel, washed with demineralized water, and dried in an oven at 70° C. for about 16 hours. A dry, white, dimethylformamide-soluble ternary polymer is obtained. Its chemical constitution is given in the first paragraph of this example.

EXAMPLE 8

This example illustrates the preparation of a ternary polymer containing in the polymer molecule an average of, by weight, about 4.4% of 2-hydroxy-3-butenenitrile units, about 5.6% of units of ethyl vinylpyridine consisting mainly of 2-vinyl-5-ethylpyridine and the remainder acrylonitrile units.

The copolymerization is effected continuously, using the same apparatus and method described in Example 5. The following solutions are fed to the reactor containing the previously prepared slurry (as in Example 5) at such a rate that the stated quantities are delivered each hour.

*Feed 1*

| | Parts |
|---|---|
| Ammonium persulfate | 28.4 |
| Sulfuric acid | 25.4 |
| Demineralized water | 1030.0 |

Feed 2

| | |
|---|---|
| Ethyl vinylpyridine consisting mainly of 2-vinyl-5-ethylpyridine | 58 |
| 2-hydroxy-3-butenenitrile | 58 |
| Acrylonitrile | 1040 |

The percentage proportions of the foregoing copolymerizable ingredients are as follows: Ethyl vinylpyridine consisting mainly of 2-vinyl-5-ethylpyridine, 5.02%; 2-hydroxy-3-butenenitrile, 5.02%; and acrylonitrile, 89.96%.

Feed 3

| | |
|---|---|
| Sodium meta-bisulfite | 3.46 |
| Demineralized water | 1050.00 |

The temperature of the slurry is maintained at 40° C., and the copolymerization reaction is stopped at the end of 6½ hours. The slurries are combined, and the ternary polymer is isolated, washed and dried in the same manner as described in the preceding example. A dry, white, dimethylformamide-soluble ternary polymer is obtained. Its chemical constitution is given in the first paragraph of this example.

Instead of the specific vinylpyridine modifying comonomers employed in Examples 5 and 8, one can use other vinylpyridines in lieu thereof, including those represented by the formula IV 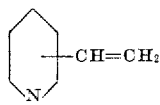

and which include 2-vinylpyridine, 3-vinylpyridine and 4-vinylpyridine; and methyl vinylpyridines embraced by the formula V 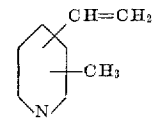

other than 2-methyl-5-vinylpyridine and which include 2-methyl-3-vinylpyridine, 3-vinyl-4-methylpyridine, 3-vinyl-5-methylpyridine, 2-vinyl-3-methylpyridine, 2-vinyl-4-methylpyridine, 2-vinyl-5-methylpyridine, 2-vinyl-6-methylpyridine, 2-methyl-4-vinylpyridine and 3-methyl-4-vinylpyridine. The vinylpyridines embraced by Formula V are a preferred sub-group within a broader class of vinylpyridines that are advantageously employed in making ternary polymers for use in practicing the present invention and which may be represented by the formula VI 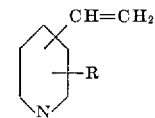

and wherein R represents a lower alkyl radical, more particularly a methyl, ethyl, propyl (including n-propyl and isopropyl) or butyl (including n-butyl, isobutyl, sec.-butyl and tert.-butyl) radical. Other examples include 2-vinyl-4,6-dimethylpyridine, the 2- and 4-vinylquinolines, 2-vinyl-4,6-diethylpyridine and others embraced by the formula VII 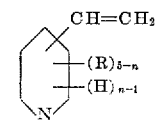

wherein R represents a lower alkyl radical, examples of which have been given hereinbefore, and $n$ represents an integer from 1 to 5, inclusive.

EXAMPLE 9

This example illustrates the preparation of a ternary polymer containing in the polymer molecule an average of, by weight, about 2.5% of vinyl acetate units, about 9% of units of 3-hydroxy-4-pentenenitrile, and the remainder acrylonitrile units.

The copolymerization is effected continuously, using the same apparatus and method described in Example 5. The following solutions are fed to the reactor containing the previously prepared slurry (same composition as in Example 5 but additionally containing 5.2 parts of $H_2SO_4$) at such a rate that the stated quantities are delivered each hour.

Feed 1

| | Parts |
|---|---|
| Ammonium persulfate | 18.4 |
| Demineralized water | 1025.0 |

Feed 2

| | |
|---|---|
| 3-hydroxy-4-pentenenitrile | 92 |
| Vinyl acetate | 23 |
| Acrylonitrile | 1040 |

Feed 3

| | |
|---|---|
| Sodium meta-bisulfite | 2.3 |
| Demineralized water | 1050.0 |

The temperature of the slurry is maintained at 40° C., and the copolymerization reaction is stopped at the end of 6 hours. The slurries are combined, and the ternary polymer is isolated, washed and dried in the same manner as described in Example 5. A dry, white, dimethylformamide-soluble ternary polymer is obtained. Its chemical constitution is given in the first paragraph of this example.

EXAMPLE 10

To a reaction vessel fitted with a reflux condenser are added the following:

| | Parts |
|---|---|
| Acrylonitrile | 90.0 |
| Acrylamide | 5.0 |
| 2-hydroxy-3-butenenitrile | 5.0 |
| Methyl ethyl ketone | 900.0 |
| Alpha,alpha'-azobisisobutyronitrile (polymerization catalyst) | 1.0 |

The vessel is heated on a steam bath, and after a reaction time of 3 hours the resulting slurry is allowed to stand for about 16 hours. Thereafter an additional 1 part of the azo catalyst is added, and the reaction mass is heated under reflux for another 3 hours. The ternary polymer of acrylonitrile, acrylamide and 2-hydroxy-3-butenenitrile is separated by filtration and dried. It is more hydrophilic than homopolymeric acrylonitrile or a similarly prepared copolymer obtained by polymerization of a mixture of 95% of acrylonitrile and 5% acrylamide. The advantages of this hydrophilic property have been mentioned hereinbefore.

It will be understood, of course, by those skilled in the art that our invention is not limited to the specific ingredients named in the above illustrative examples nor to the particular proportions and methods of copolymerization mentioned therein. Thus, other modifying comonomers, in addition to those named in Examples 5 and 7–10, can be used. Illustrative examples of such comonomers are vinyl compounds which are different from acrylonitrile (vinyl cyanide) and hydroxynitriles of the kind embraced by Formula I, including the different aromatic and isopropenyl aromatic compounds, more particularly the different vinyl aromatic and isopropenyl aromatic hydrocarbons (e. g., styrene and the various monoalkyl and dialkyl styrenes, isopropenyl toluene, etc.), other different aliphatic compounds contains a $CH_2=C<$ grouping, e. g., the different substituted acrylonitriles (e. g., methacrylonitrile, ethacrylonitrile, phenylacrylonitrile, etc.), substituted acrylamides (e. g., methacrylamide, ethacrylamide, the N-substituted acrylamides and N-substituted alkacrylamides, for instance N-methylol acrylamide, the N-(hydroxyethyl)

acrylamides, N-monoalkyl and -dialkyl acrylamides and methacrylamides, e. g., N-monomethyl, -ethyl, -propyl, -butyl, etc., and N-dimethyl, -ethyl, -propyl, -butyl, etc., acrylamides and methacrylamides, N-monoaryl and -diaryl acrylamides and alkacrylamides, e. g., N-monophenyl and -diphenyl acrylamides and methacrylamides, etc.), vinyl esters, e. g., vinyl acetate, vinyl propionate, vinyl butyrate, vinyl isobutyrate, vinyl valerate, vinyl acrylate, vinyl methacrylate, etc., acrylic and methacrylic acids, esters of an acrylic acid (including acrylic acid itself and the various alpha-substituted acrylic acids, e. g., methacrylic acid, ethacrylic acid, phenylacrylic acid, etc.), more particularly the alkyl esters of such acids, e. g., ethyl, propyl, butyl, amyl, hexyl, heptyl, octyl, decyl, dodecyl, etc., esters thereof, especially those containing not more than five or six carbon atoms in the alkyl grouping, and other different compounds containing a $CH_2=<$ grouping, more particularly a single $CH_2=C<$ grouping.

The proportions of any modifying comonomer or comonomers that are incorporated in the polymerizable composition together with the hydroxynitrile and acrylonitrile can be varied considerably. Ordinarily, however, the acrylonitrile constitutes a major or preponderant proportion (more than 50%) by weight of monomers to be copolymerized, the hydroxynitrile constitutes from about 5% to about 45% of the total weight of the acrylonitrile and the hydroxynitrile, and any modifying comonomer or comonomers (if present in the polymerizable mixture) constitute the remainder of the total amount of comonomers which are subjected to copolymerization. In the preferred, fiber-forming, acrylonitrile copolymer compositions (more particularly thermoplastic acrylonitrile copolymer compositions) of the present invention, the acrylonitrile is employed in the mixture of comonomers in an amount such that at least 80% by weight of combined acrylonitrile is present in the copolymer.

Although many of the new copolymers of this invention are particularly useful in the formation of fibers or filaments having improved properties over that provided by homopolymeric acrylonitrile, they also have numerous other applications in the plastics and coating arts. For instance, with or without a filler or other additive, they may be used as molding compositions (or as components of molding compositions) from which molded articles are produced by molding the compositions under heat and pressure, e. g., temperatures of the order of 130° C. or 140° C. to 200° C. and under pressures up to 10,000 pounds or more per square inch. Among the fillers that can be employed in the production of molding compositions are alpha-cellulose pulp, asbestos fibers, cotton flock, chopped cloth cuttings, glass fibers, wood flour, antimony oxide, titanium dioxide, sand, clay, mica dust, diatomaceous earth, etc.

The polymerizable compositions can be used in the production of castings of any desired shape or size; as adhesives; in the treatment of paper or paper stock, or textile materials; in coating compositions; and for various other purposes. The copolymer can be formed in situ after application of the monomeric mixture to the base material to be coated, impregnated or otherwise treated. The soluble copolymers of this invention also can be used in similar applications, as well as in others, for instance: as modifiers, more particularly plasticizers, of aminoplast, phenoplast and other synthetic resins; as components of soil-conditioning, soil-stabilization and grouting compositions; as chemical intermediates for producing other compositions, e. g., as reactants with isocyanates; and for many other purposes that will be apparent to those skilled in the art from the foregoing description.

Products comprising oriented fibers can be produced from the acrylonitrile copolymers of the present invention in the manner described in, for example, Cresswell Patents 2,558,730 and 2,558,731 and Cresswell and Wizon Patent 2,558,733.

We claim:

1. A fiber-formable copolymer obtained by polymerization of a mixture of copolymerizable ingredients including, by weight, (1) from about 5.0% to about 8.9% of a hydroxynitrile represented by the general formula

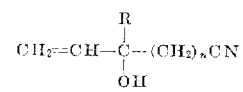

where R represents a member of the class consisting of hydrogen and the methyl radical, and $n$ represents a whole number from 0 to 1, inclusive, (2) from about 2.0% to about 8.9% of a monoethylenically unsaturated substance selected from the class consisting of (a) methyl acrylate, (b) vinyl acetate, (c) acrylamide, (d) methyl vinylpyridine consisting mainly of 2-methyl-5-vinylpyridine and (e) ethyl vinylpyridine consisting mainly of 2-vinyl-5-ethylpyridine, and (3) acrylonitrile constituting the remainder.

2. A fiber-formable copolymer as in claim 1 wherein the hydroxynitrile of (1) is 2-hydroxy-2-methyl-3-butenenitrile.

3. A fiber-formable copolymer as in claim 1 wherein the unsaturated substance of (2) is methyl acrylate.

4. A product comprising an oriented fiber comprised of a fiber-formable copolymer as defined in claim 1.

References Cited in the file of this patent

UNITED STATES PATENTS 2,601,659     Hearne et al.            June 24, 1952

UNITED STATES PATENT OFFICE
Certificate of Correction

Patent No. 2,812,315 November 5, 1957

John A. Price et al.

It is hereby certified that error appears in the printed specification of the above numbered patent requiring correction and that the said Letters Patent should read as corrected below.

Column 11, line 17, for "$CH_2=<$grouping," read —$CH_2=C<$grouping,—.

Signed and sealed this 28th day of January 1958.

[SEAL]

Attest:
KARL H. AXLINE,
*Attesting Officer.*

ROBERT C. WATSON,
*Commissioner of Patents.*